United States Patent
Schwert et al.

(10) Patent No.: US 11,914,030 B2
(45) Date of Patent: Feb. 27, 2024

(54) SIGNAL INTEGRATION WITH TRANSCEIVER MOTION COMPENSATION

(71) Applicant: VEONEER SWEDEN AB, Vargarda (SE)

(72) Inventors: Christian Schwert, Hassfurt (DE); Dirk Klotzbuecher, Mainstockheim (DE)

(73) Assignee: VEONEER SWEDEN AB, Vargarda (SE)

( * ) Notice: Subject to any disclaimer, the term of this patent is extended or adjusted under 35 U.S.C. 154(b) by 472 days.

(21) Appl. No.: 17/293,137

(22) PCT Filed: Nov. 5, 2019

(86) PCT No.: PCT/EP2019/080191
§ 371 (c)(1),
(2) Date: May 12, 2021

(87) PCT Pub. No.: WO2020/099175
PCT Pub. Date: May 22, 2020

(65) Prior Publication Data
US 2022/0011427 A1 Jan. 13, 2022

(30) Foreign Application Priority Data
Nov. 16, 2018 (EP) .................................... 18206774

(51) Int. Cl.
*G01S 13/931* (2020.01)
*G01S 7/35* (2006.01)
*G01S 13/58* (2006.01)

(52) U.S. Cl.
CPC ............ *G01S 13/931* (2013.01); *G01S 7/352* (2013.01); *G01S 13/584* (2013.01)

(58) Field of Classification Search
CPC ....... G01S 13/931; G01S 7/352; G01S 13/584
See application file for complete search history.

(56) References Cited

U.S. PATENT DOCUMENTS

2017/0146638 A1* 5/2017 Aoyama ................. G01S 7/288

OTHER PUBLICATIONS

International Search Report and Written Opinion of PCT/EP2019/080191 dated Jan. 22, 2020.

* cited by examiner

*Primary Examiner* — Peter M Bythrow
*Assistant Examiner* — Nazra Nur Waheed
(74) *Attorney, Agent, or Firm* — DICKINSON WRIGHT PLLC (57) ABSTRACT

A method and apparatus for processing a transceiver signal (115) detected by a transceiver (110). The method includes obtaining (S1) a processed signal from the transceiver signal (115), the processed signal having frames (200, 300) corresponding to respective time intervals (t1, t2, t3, t4), wherein the frames define bins (210, 310) configured according to a quantized resolution (dr) of the transceiver signal (115). The method further includes obtaining (S2) data related to a relative motion of the transceiver (110) during a time interval (t1, t2, t3, t4) and initializing (S3) a residual distance to zero. For each frame (200, 300) and each respective time interval (t1, t2, t3, t4) the method further includes determining (S4) a shift distance (ds1, ds3) corresponding to a sum of the residual distance and a distance value (d1, d2) corresponding to a relative motion of the transceiver (110) in the respective time interval (t1, t2, t3, t4) and rounding (S5) the determined shift distance (ds1, ds3) with respect to the distance resolution (dr) to a rounded shift distance. The method then further includes updating (S6) the residual distance based on a difference between the determined shift distance (ds1, ds3) and the rounded shift distance, and generating (S7) an adjusted frame (304) by shifting the bins (310) of the frame by the rounded shift distance to account for relative transceiver motion with respect to the object (150) in the respective time interval. The method finally (Continued)

includes processing (S8) the signal by integrating bin values (210, 310) over the adjusted frames (300).

15 Claims, 6 Drawing Sheets

SIGNAL INTEGRATION WITH TRANSCEIVER MOTION COMPENSATION

CROSS-REFERENCE TO RELATED APPLICATIONS

This application is a 35 U.S.C. § 371 national phase of PCT International Application No. PCT/EP2019/080191, filed Nov. 5, 2019, which claims the benefit of priority under 35 U.S.C. § 119 to European Patent Application No. 18206774.4, filed Nov. 16, 2018, the contents of which are incorporated herein by reference in their entirety.

FIELD OF THE INVENTION

The present disclosure relates to a method for processing a signal detected by a transceiver, where the signal includes frames corresponding to respective time intervals. The frames include bins configured according to a quantized resolution of the signal.

BACKGROUND

Many vehicle radar systems include radar transceivers that are arranged for generating radar signals that are transmitted, reflected and received by use of appropriate antennas included in the radar system. The radar signals may for example be in the form of FMCW (Frequency Modulated Continuous Wave) signals.

Sometimes it is desired to enhance the integration gain, or signal to noise ratio, with maintained resolution of a radar transceiver in order to be able to distinguish a target, for example in a noisy environment, if the target provide weak detections, and if the target should be analyzed further, for example if the type of target should be determined.

This can be done by correcting for the motion of the radar transceiver, and it is an object of the present disclosure to provide such a correction in an efficient manner with reduced computational complexity.

SUMMARY

The above-described object is achieved by a method for processing a transceiver signal detected by a transceiver, the method including obtaining a processed signal from the transceiver signal, the processed signal in the form of frames corresponding to respective time intervals. The frames include bins configured according to a quantized resolution of the transceiver signal. The method further includes obtaining data related to a relative motion of the transceiver with respect to an object in a field of view of the transceiver during a time interval, and initializing a residual distance to zero.

For each frame and each respective time interval the method further includes determining a shift distance corresponding to a sum of the residual distance and a distance value corresponding to a relative motion of the transceiver with respect to the object in the respective time interval, rounding the determined shift distance with respect to the distance resolution to a rounded shift distance. Furthermore, the method then includes updating the residual distance based on a difference between the determined shift distance and the rounded shift distance and generating an adjusted frame by shifting the bins of the frame by the rounded shift distance to account for relative transceiver motion with respect to the object in the respective time interval. The method then includes processing the signal by integrating bin values over the adjusted frames.

This enables correction for radar transceiver motion in a more efficient manner than previously known, with reduced computational complexity.

The in turn enables enhancement of integration gain, or signal to noise ratio, with maintained resolution of a radar transceiver in order to be able to distinguish a target, for example in a noisy environment, if the target provide weak detections, and if the target should be analyzed further, for example if the type of target should be determined.

According to some aspects of embodiments of this invention, the signal is a radar signal detected by a radar transceiver, where the bins are configured according to a distance resolution of the radar signal. The distance resolution is proportional to a frequency span of each bin.

According to some aspects of embodiments of this invention, the radar signal is a frequency modulated continuous wave (FMCW) radar signal.

According to some aspects of embodiments of this invention, a frame corresponds to a Fourier transform or Fast Fourier Transform (FFT) vector.

The method can thus be applied for a radar system.

According to some aspects of embodiments of this invention, the data related to a relative motion of the transceiver is obtained from a Doppler shift of the received signal.

According to some aspects of embodiments of this invention, the data related to a motion of the transceiver during the time interval includes data related to a motion of the transceiver in an absolute coordinate frame.

According to some aspects of embodiments of this invention, the rounding includes rounding either:
  up to the nearest upper integer multiple of the distance resolution,
  down to the nearest lower integer multiple of the distance resolution, or
  to the nearest integer multiple of the distance resolution.
  In this way, any suitable type of rounding can be used.

According to some aspects of embodiments of this invention, obtaining data related to a motion of the transceiver in a vehicle includes obtaining data related to an acceleration of the vehicle in a time interval.

In this manner, possible acceleration can also be taken into account.

According to some aspects of embodiments of this invention, obtaining data related to a motion of the transceiver includes filtering the data to suppress noise in the data.

According to some aspects of embodiments of this invention, the filtering includes any of Kalman filtering, particle filtering, or Wiener filtering.

The filtering can thus be performed in many known ways.

According to some aspects of embodiments of this invention, obtaining data related to a motion of the transceiver in a vehicle includes obtaining data related to a heading of the vehicle.

In this way, the heading of the vehicle can be taken into account.

The present disclosure also relates to a corresponding control unit that is associated with the advantages according to the above.

BRIEF DESCRIPTION OF THE DRAWINGS

The present disclosure will now be described in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
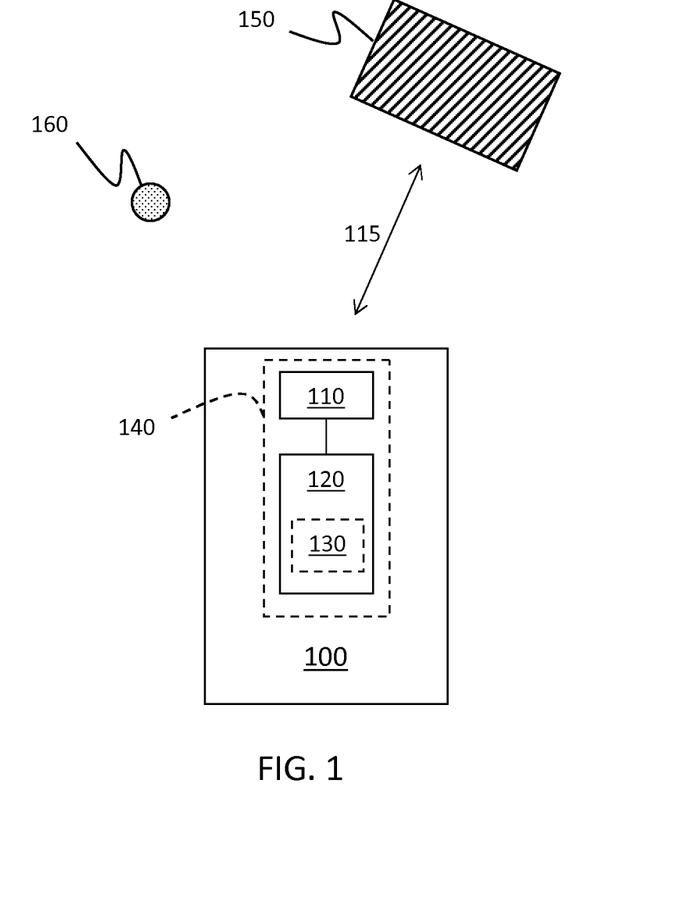
FIG. 1 shows a schematic top view of a vehicle with a radar transceiver.

FIG. 1 shows a vehicle 100 that includes a radar system 140 which in turn includes a radar transceiver 110 and a control unit 120. The radar transceiver 110 is according to some aspects constituted by an FMCW (Frequency Modulated Continuous Wave) transceiver adapted for transmitting frequency modulated signals and receiving corresponding reflected signals in a previously known manner. In this example a signal has been reflected by an object 150 within a field of view of the transceiver 110 during a time interval constitutes a transceiver signal 115 that has been detected by a transceiver 110, where the transceiver 110 has a relative motion with respect to the object 150. The transceiver signal 115 is mixed with the transmitted signal such that a difference signal that constitutes an IF (Intermediate Frequency) signal is obtained and filtered.

Figure 2:
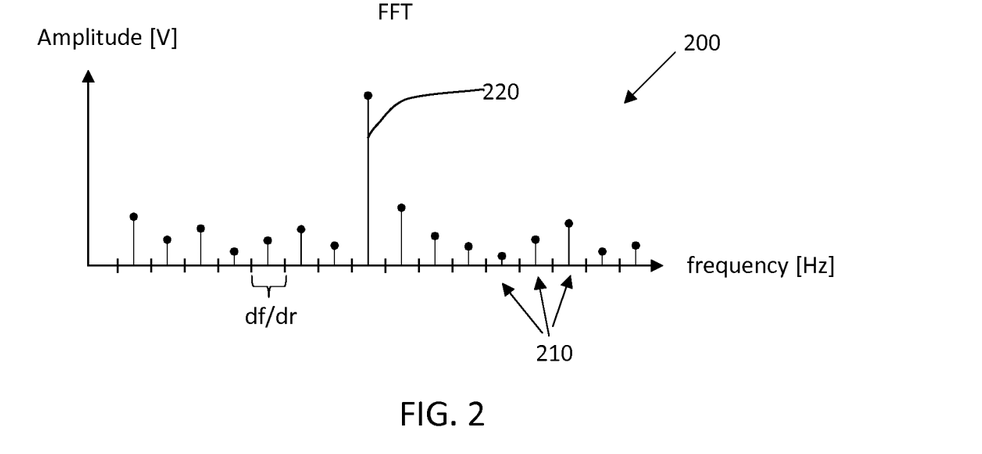
FIG. 2 schematically illustrates a radar signal frame.

By use of, for example, FFT (Fast Fourier Transform) the IF signal is transformed to a processed signal that, as shown in FIG. 2, forms frames 200, where each frame 200 corresponds to a respective time interval dt and according to some aspects is constituted by an FFT vector. Each frame 200 defines bins 210 configured according to a distance resolution dr of the processed signal, where the distance resolution dr is proportional to a corresponding frequency span df of each bin in a known manner. In each bin 210, there is a signal detection 220 that has a complex value, i.e. a magnitude and a phase angle.

Figure 3A:
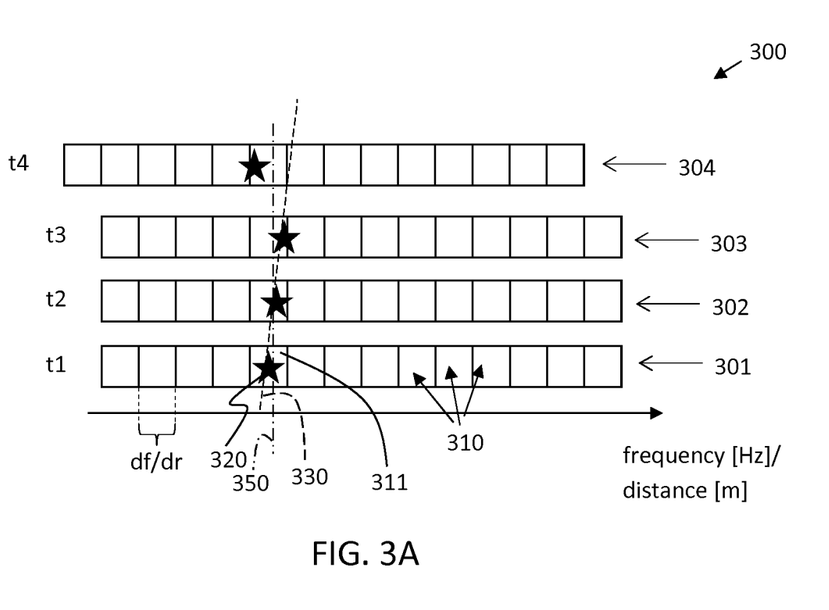
FIGS. 3A-3B illustrate radar signal frames over time intervals.

As shown in FIG. 3A, there is a plurality of frames 300, each frame 301, 302, 303, 304 corresponding to a respective radar scan and a respective time interval t1, t2, t3, t4 and defining a plurality of bins 310. A signal detection 320 corresponding to the object 150 is shown in a certain bin 311, for a first time interval t1, a second time interval t2 and a third time interval t3. A constant phase angle for the signal detection 320 between the time intervals t1, t2, t3 corresponds to an absence of relative motion of the transceiver 110 with respect to the object 150, while a changing phase for the signal detection 320 between the time intervals t1, t2, t3 corresponds to a certain relative motion of the transceiver 110 with respect to the object 150. A further FFT of the bin values for different time intervals reveals the relative motion such that a range-Doppler matrix can be obtained in a previously known manner.

In this example, there is a relative motion of the transceiver 110 with respect to the object 150 during the three time intervals t1, t2, t3, which is conceptually illustrated as the corresponding signal detection 320 moves within its bin 311 as shown for three corresponding consecutive frames 301, 302, 303, and also illustrated with a line 330 that runs through the signal detection 320. Finally, the signal detection 320 will leave its bin for a neighboring bin.

In order to compensate for error sources such as background noise, it is sometimes desirable to integrate the frames 301, 302, 303 with their signal detections 320 over time such that the signal detection 320 is easier to distinguish. If there is a relative motion of the transceiver 110 with respect to the object 150, and the corresponding signal detection 320 leaves its bin for a neighboring bin, this will affect the integration negatively, the signal detection 320 being smeared over several bins during the integration.

It is therefore desired to integrate and at the same time compensate for the relative motion. According to the present disclosure, as illustrated for a fourth time t4 in FIG. 3A, when the signal detection 320 leaves its bin for a neighboring bin 340 in a corresponding frame 304, the bins are shifted such that the signal detection 320 appears at its original bin.

Figure 3B:
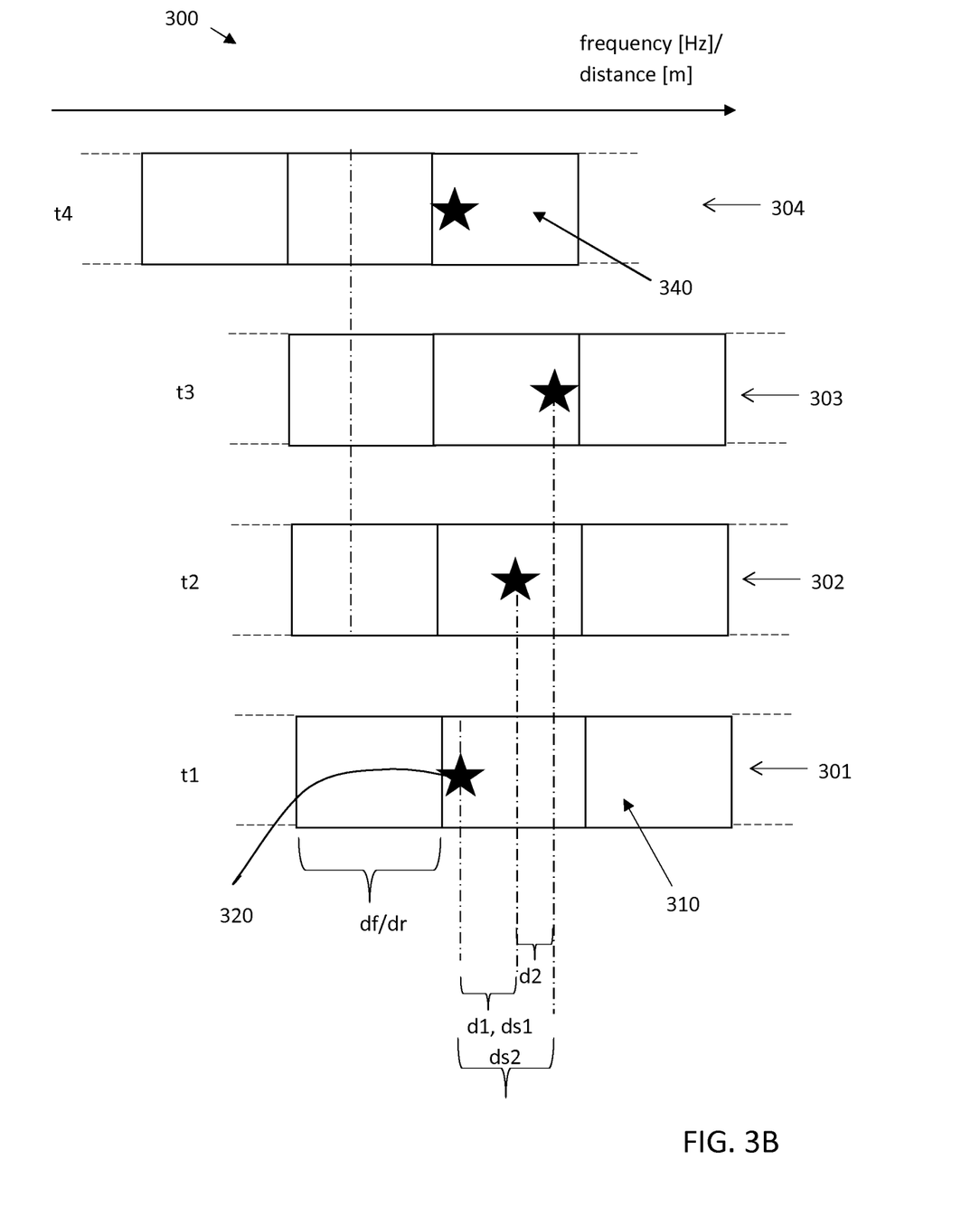

How this is accomplished will now be described more in detail with reference to FIG. 3B that shows an enlarged part of FIG. 3A around the signal detection 320. A residual distance is initially set to zero at a first time interval t1. At a following second time interval t2, at a first cycle, a first shift distance ds1 is determined corresponding to a sum of the residual distance, which here is initially zero, and a first distance value d1 corresponding to a relative motion of the transceiver 110 with respect to the object 150 in the second time interval t2. The first shift distance ds1 then here equals the first distance value ds1.

Next, the first shift distance ds1 is rounded with respect to the distance resolution dr to a first rounded shift distance. According to some aspects the rounding includes rounding to the nearest integer multiple of the distance resolution dr. Here, the first shift distance ds1 falling below half the distance resolution dr, the rounding is zero and the rounded shift distance is zero.

Then the residual distance is updated based on a difference between the determined first shift distance ds1 and the rounded shift distance which is zero, i.e. the residual distance equals the first shift distance ds1. After that an adjusted frame is generated by shifting the bins 310 of the frame by the rounded shift distance to account for relative transceiver motion with respect to the object in the respective time interval, in this case there is no shift since the rounded shift distance is zero.

At a following cycle, at a following third time interval t3, a second shift distance ds2 is determined corresponding to a sum of the residual distance, which here equals the first shift distance ds1, and a second distance value d2 corresponding to a relative motion of the transceiver 110 with respect to the object 150 in the second time interval t3. The second shift distance ds2 then here equals a sum of the first distance value d1 and the second distance value d2.

Next, the second shift distance ds2 is rounded with respect to the distance resolution dr to a second rounded shift distance. Here, the second shift distance ds2 exceeding half the distance resolution dr but still falling below the distance resolution dr, the rounding equals the distance resolution dr.

Then the residual distance is updated based on a difference between the determined second shift distance ds2 and the rounded shift distance which is the distance resolution dr. After that, an adjusted frame is generated by shifting the bins 310 of the frame by the rounded shift distance dr which is shown for a fourth time interval t4. Here, the signal detection 320 has just moved to a neighboring bin 340.

The above procedure is repeated for all frames for which an integration is to be made. When all frames have been processed according to the above, the signal is further processed by integrating bin values 310, 340 over the adjusted frames 300.

In case there are more than one object of interest 150, 160, then the procedure can be repeated separately for each object, at least if the different objects have different relative velocities.

It is noted that by applying an FFT, as for generating Doppler values, an integration is implicitly performed. However, it is appreciated that the integrating can be performed in a number of different ways according to different implementation aspects of the technique. For instance, magnitudes of frame values can be summed. This integration is then independent of phase value in the different bins.

A coherent integration can also be performed, i.e., summing complex values in the bins over time. Such a coherent integration may include adjusting phases to account for the relative velocity.

According to some aspects, the adjusted frame is generated by shifting the bins 310 of the frame by the rounded shift distance dr.

In the above, the present disclosure has been described for a radar system 140 which in turn includes a radar transceiver 110 and a control unit 120. Generally, the present disclosure can be applied to any kind of suitable environment detection system which includes a transceiver adapted to detect a signal and a control unit. The detected signal includes frames corresponding to respective time intervals t1, t2, t3, t4, where the frames include bins configured according to a quantized resolution of the signal. The type of signal and transceiver used is dependent on the kind of environment detection system, where according to some aspects a camera system is adapted to detect image signals and a Lidar system is adapted to detect light signals.

Figure 4:
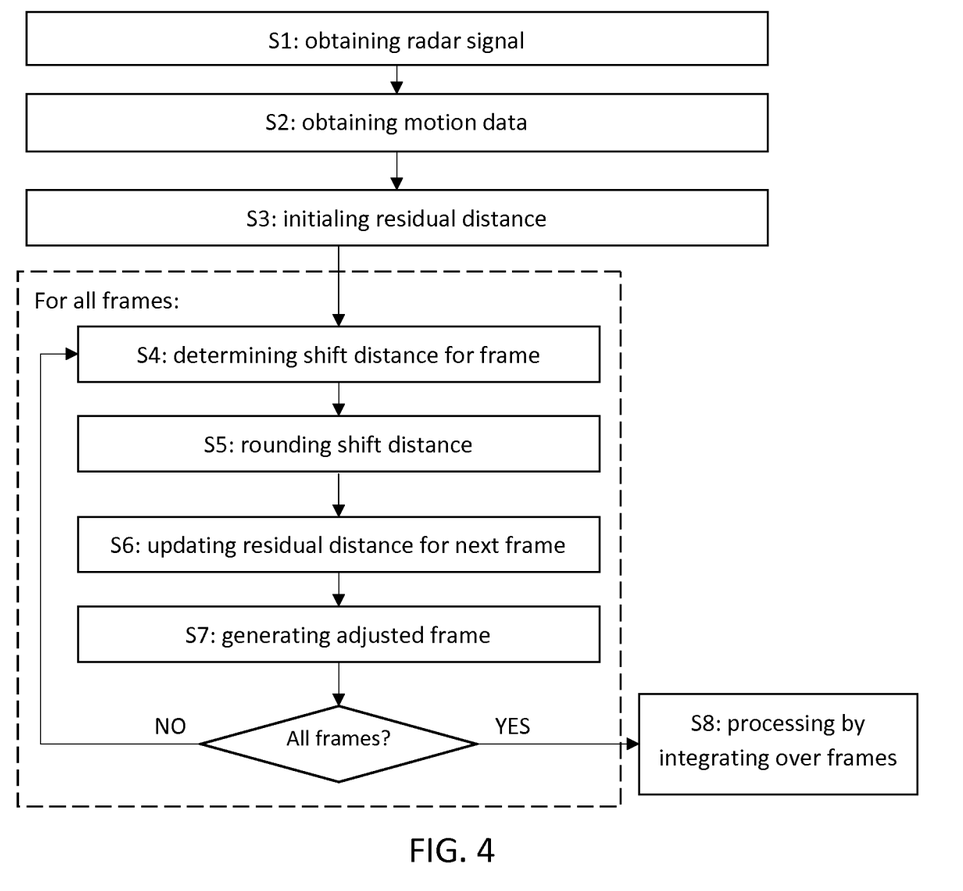
FIG. 4 is a flow chart illustrating methods.

Generally, the present disclosure corresponds to a method that is illustrated in a flowchart in FIG. 4. The method relates to processing a transceiver signal 115 detected by a transceiver 110. The method includes obtaining S1 a processed signal from the transceiver signal 115, the processed signal including frames 200, 300 corresponding to respective time intervals t1, t2, t3, t4, wherein the frames define bins 210, 310 configured according to a quantized resolution dr of the transceiver signal 115. The method further includes obtaining S2 data related to a relative motion of the transceiver 110 with respect to an object 150 in a field of view of the transceiver 110 during a time interval t1, t2, t3, t4 and initializing S3 a residual distance to zero.

For each frame 200, 300 and each respective time interval t1, t2, t3, t4 the method further includes determining S4 a shift distance ds1, ds3 corresponding to a sum of the residual distance and a distance value d1, d2 corresponding to a relative motion of the transceiver 110 with respect to the object 150 in the respective time interval t1, t2, t3, t4, rounding S5 the determined shift distance ds1, ds3 with respect to the distance resolution dr to a rounded shift distance. Furthermore, the method then includes updating S6 the residual distance based on a difference between the determined shift distance ds1, ds3 and the rounded shift distance, and generating S7 an adjusted frame 304 by shifting the bins 310 of the frame by the rounded shift distance to account for relative transceiver motion with respect to the object 150 in the respective time interval. The method then includes processing S8 the signal by integrating bin values 210, 310 over the adjusted frames 300.

According to some aspects of embodiments of the present invention, as discussed above, the signal is a radar signal detected by a radar transceiver 110, where the bins 210, 310 are configured according to a distance resolution dr of the radar signal 115. The distance resolution dr is proportional to a frequency span df of each bin 210, 310.

According to some aspects of embodiments of the present invention, the radar signal is a frequency modulated continuous wave (FMCW) radar signal.

According to some aspects of embodiments of the present invention, a frame corresponds to a Fourier transform or Fast Fourier Transform (FFT) vector.

According to some aspects of embodiments of the present invention, the data related to a relative motion of the transceiver 110 is obtained from a Doppler shift of the received signal.

According to some aspects of embodiments of the present invention, the data related to a motion of the transceiver 110 during the time interval t1-t4 includes forms data related to a motion of the transceiver 110 in an absolute coordinate frame.

According to some aspects of embodiments of the present invention, the rounding comprises either:
rounding up to the nearest upper integer multiple of the distance resolution dr;
rounding down to the nearest lower integer multiple of the distance resolution dr; or
rounding to the nearest integer multiple of the distance resolution dr.

According to some aspects of embodiments of the present invention, obtaining data related to a motion of the transceiver 110 in a vehicle 100 includes obtaining data related to an acceleration of the vehicle 100 in a time interval.

According to some aspects of embodiments of the present invention, obtaining data related to a motion of the transceiver 110 includes filtering the data to suppress noise in the data. According to some aspects, the filtering may include any of Kalman filtering, particle filtering, or Wiener filtering.

According to some aspects of embodiments of the present invention, obtaining data related to a motion of the transceiver 110 in a vehicle 100 includes obtaining data related to a heading of the vehicle 100.

Figure 5:
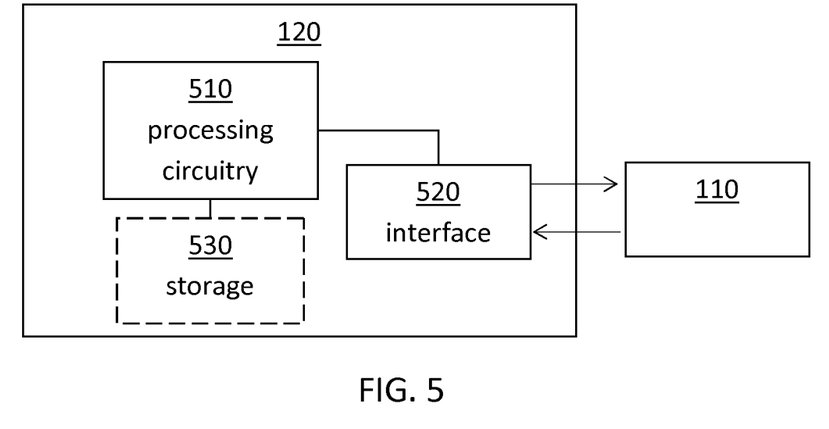
FIG. 5 schematically illustrates a control unit.

FIG. 5 schematically illustrates a control unit 120 according to aspects of the present disclosure. It is appreciated that the above described methods and techniques may be realized in hardware. This hardware is then arranged to perform the methods, whereby the same advantages and effects are obtained as have been discussed above.

Processing circuitry 510 is provided using any combination of one or more of a suitable central processing unit (CPU), multiprocessor, microcontroller, digital signal processor (DSP), etc., capable of executing software instructions stored in a computer program product, e.g. in the form of a storage medium 530. The processing circuitry 510 may further be provided as at least one application specific integrated circuit (ASIC), or field programmable gate array (FPGA).

Particularly, the processing circuitry 510 is configured to cause the classification unit to perform a set of operations, or steps. For example, the storage medium 530 may store the set of operations, and the processing circuitry 510 may be configured to retrieve the set of operations from the storage medium 530 to cause the classification unit to perform the set of operations. The set of operations may be provided as a set of executable instructions. Thus, the processing circuitry 510 is thereby arranged to execute methods as herein disclosed.

The storage medium 530 may also be provided in the form of persistent storage, which, for example, can be any single one or combination of magnetic memory, optical memory, solid state memory or even remotely mounted memory.

The control unit 120 may further include a communications interface 520 for communications with at least one external device such as the transceiver 110. As such the communication interface 520 may include one or more transmitters and receivers, comprising analogue and digital components and a suitable number ports for wireline or wireless communication.

The processing circuitry 510 controls the general operation of the unit, e.g. by sending data and control signals to the communication interface 520 and the storage medium 530, by receiving data and reports from the communication interface 520, and by retrieving data and instructions from the storage medium 530. Other components, as well as the related functionality, of the unit are omitted in order not to obscure the concepts presented herein.

Figure 6:
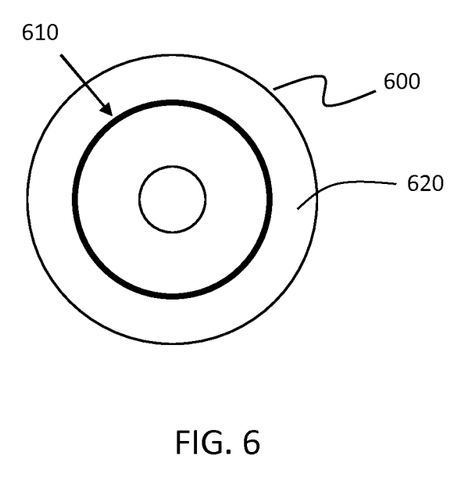
FIG. 6 shows an example computer program product.

FIG. 6 schematically illustrates a computer program product 600 including a computer program 610 according to the disclosure above, and a computer readable storage medium 620 on which the computer program is stored.

Figure 7:
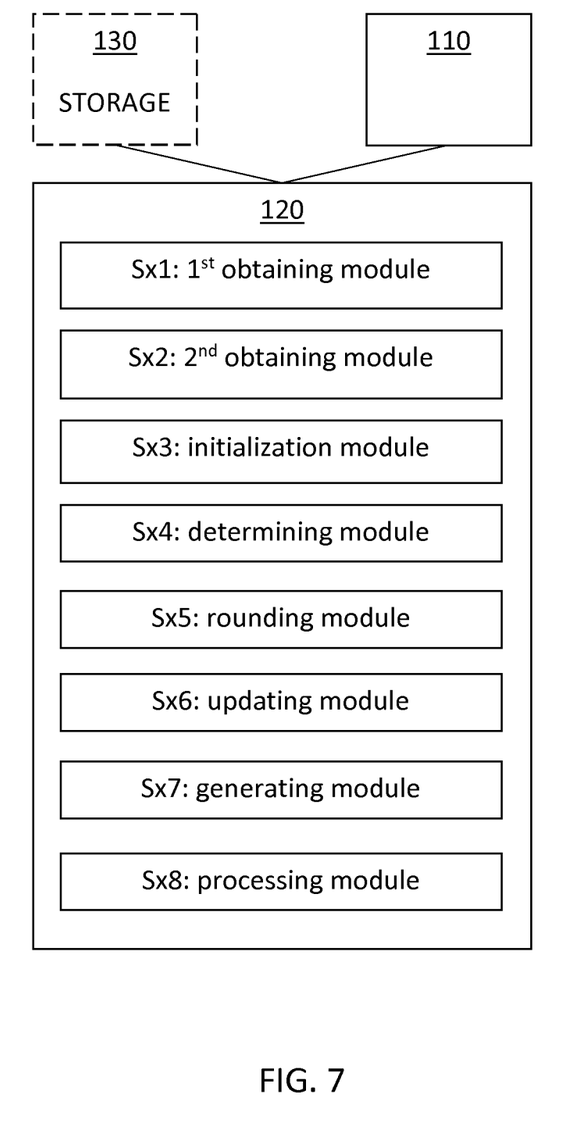
FIG. 7 schematically illustrates a control unit.

With reference to FIG. 7, the present disclosure relates to a control unit 120 for a vehicle 100, where the control unit 120 is arranged to process a transceiver signal 115 detected by a transceiver 110. The control unit 120 includes a first obtaining module Sx1 configured to obtain a processed signal from the transceiver signal 115, the processed signal comprising frames 200, 300 corresponding to respective time intervals t1, t2, t3, t4, wherein the frames include bins 210, 310 configured according to a quantized resolution dr of the transceiver signal 115, The control unit 120 further includes a second obtaining module Sx2 configured to obtain data related to a relative motion of the transceiver 110 with respect to an object 150 in a field of view of the transceiver 110 during a time interval t1, t2, t3, t4, and an initialization module Sx3 configured to initialize a residual distance to zero.

The control unit 120 is arranged to, for each frame 200, 300 and each respective time interval t1, t2, t3, t4, determine, by a determining module Sx4 a shift distance ds1, ds3 corresponding to a sum of the residual distance and a distance value d1, d2 corresponding to a relative motion of the transceiver 110 with respect to the object in the respective time interval t1, t2, t3, t4 and to round, by a rounding module Sx5, the determined shift distance ds1, ds) with respect to the distance resolution dr to a rounded shift distance.

The control unit 120 is then arranged to update, by an updating module Sx6, the residual distance based on a difference between the determined shift distance ds1, ds3 and the rounded shift distance, and to generate, by a generating module Sx7, an adjusted frame 340 by shifting the bins of the frame by the rounded shift distance to account for relative transceiver motion with respect to the object 150 in the respective time interval.

The control unit 120 further includes a processing module Sx8 configured to process the signal by integrating the bin values over the adjusted frames.

According to some aspects of embodiments of the present invention, the signal is a radar signal detected by a radar transceiver 110, where the bins 210, 310 are configured according to a distance resolution dr of the radar signal 115.

The distance resolution dr is proportional to a frequency span df of each bin 210, 310.

The present disclosure is not limited to the examples described above, but may vary within the scope of the appended claims. For example, the method can be applied to any suitable type of environment sensor, and in any kind of vehicle.

While the above description constitutes the preferred embodiment of the present invention, it will be appreciated that the invention is susceptible to modification, variation and change without departing from the proper scope and fair meaning of the accompanying claims.

The invention claimed is:

1. A method for processing a transceiver signal detected by a transceiver, the method comprising the steps of:
   obtaining a processed signal from the transceiver signal, the processed signal comprising frames corresponding to respective time intervals, wherein the frames comprise bins configured according to a distance resolution of the transceiver signal;
   obtaining data related to a relative motion of the transceiver with respect to an object in a field of view of the transceiver during the respective time intervals;
   initializing a residual distance to zero; and, for each of the frames and each of the respective time intervals;
   determining a shift distance corresponding to a sum of a residual distance and a distance value corresponding to the relative motion of the transceiver with respect to the object in the respective time intervals;
   rounding the determined shift distance with respect to the distance resolution to a rounded shift distance;
   updating the residual distance based on a difference between the determined shift distance and the rounded shift distance;
   generating an adjusted frame by shifting the bins of the frames by the rounded shift distance to account for the relative motion of the transceiver with respect to the object in the respective time intervals; and
   processing the signal by integrating values of the bins over the adjusted frames.

2. The method according to claim 1, further comprising wherein the signal is a radar signal detected by the transceiver in the form of a radar transceiver, where the distance resolution is proportional to a frequency span of each of the bins.

3. The method according to claim 2, further comprising, wherein the radar signal is a frequency modulated continuous wave radar signal.

4. The method according to claim 1, further comprising wherein the frames correspond to a Fourier transform or a Fast Fourier Transform vector.

5. The method according to claim 1, further comprising wherein the data related to the relative motion of the transceiver is obtained from a Doppler shift of the transceiver signal.

6. The method according to claim 1, wherein the data related to the relative motion of the transceiver during the time interval comprises data related to the relative motion of the transceiver in an absolute coordinate frame.

7. The method according to claim 1, wherein the rounding step comprises rounding up to a nearest upper integer multiple of the distance resolution.

8. The method according to claim 1, wherein the rounding step comprises rounding down to a nearest lower integer multiple of the distance resolution.

9. The method according to claim 1, wherein the rounding step comprises rounding to a nearest integer multiple of the distance resolution.

10. The method according to claim 1, wherein the obtaining data related to the relative motion of the transceiver step comprises obtaining data related to an acceleration of the vehicle in the respective time intervals.

11. The method according to claim 1, wherein the obtaining data related to the relative motion of the transceiver step comprises filtering the data to suppress noise in the data.

12. The method according to claim 10, wherein the filtering comprises any one of a Kalman filtering, a particle filtering, and a Wiener filtering.

13. The method according to claim 1, wherein the obtaining data related to the relative motion of the transceiver step comprises obtaining data related to a heading of the vehicle.

14. A control unit for a vehicle where the control unit is arranged to process a transceiver signal detected by a transceiver, where the control unit comprises:
 a first obtaining module configured to obtain a processed signal from the transceiver signal, the processed signal comprising frames corresponding to respective time intervals, wherein the frames comprise bins configured according to a distance resolution of the transceiver signal;
 a second obtaining module configured to obtain data related to a relative motion of the transceiver with respect to an object in afield of view of the transceiver during the respective time intervals;
 an initialization module configured to initialize a residual distance to zero;
 wherein the control unit is arranged to, for each of the frames and each of the respective time intervals;
 determine, by a determining module a shift distance corresponding to a sum of the residual distance and a distance value corresponding to the relative motion of the transceiver with respect to the object in the respective time interval;
 round, by a rounding module, the determined shift distance with respect to the distance resolution to a rounded shift distance;
 update, by an updating module, the residual distance based on a difference between the determined shift distance and the rounded shift distance; and to
 generate, by a generating module, an adjusted frame by shifting the bins of the frames by the rounded shift distance to account for the relative transceiver motion with respect to the object in the respective time intervals; and
 a processing module configured to process the signal by integrating the bin values over the adjusted frames.

15. The control unit according to claim 14, further comprising wherein the signal is a radar signal detected by the radar transceiver, where the distance resolution is proportional to a frequency span of each of the bins.

* * * * *